E. L. LLOYD.
Window-Screen.
No. 205,658. Patented July 2, 1878.
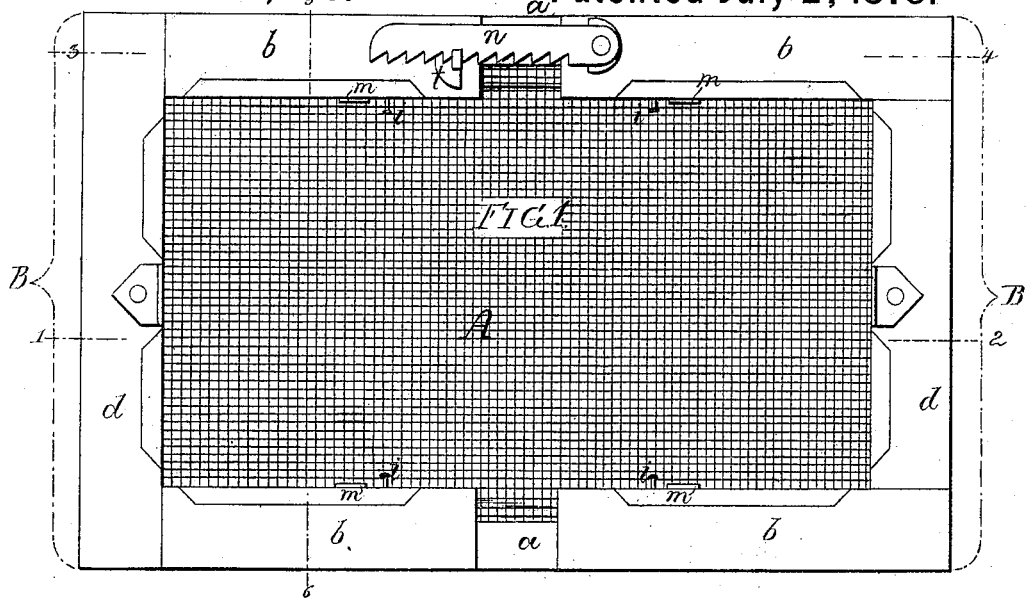
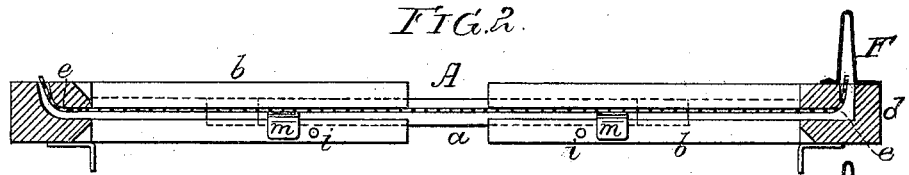
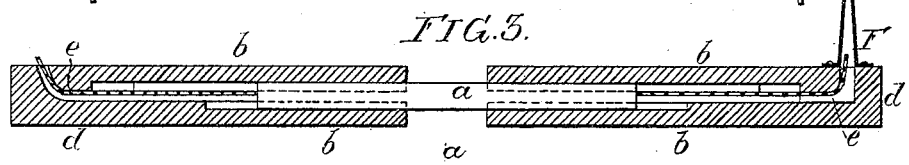
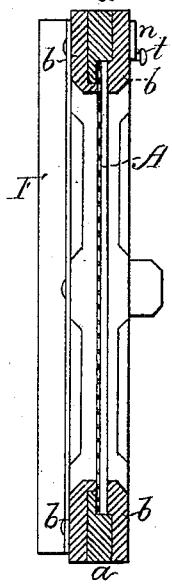
Witnesses,
Harry A. Crawford
Harry Smith
Inventor,
Edwin L. Lloyd
by his Attorneys
Howson and Son

UNITED STATES PATENT OFFICE.

EDWIN L. LLOYD, OF PHILADELPHIA, PENNSYLVANIA.

IMPROVEMENT IN WINDOW-SCREENS.

Specification forming part of Letters Patent No. 205,658, dated July 2, 1878; application filed May 11, 1878.

*To all whom it may concern:*

Be it known that I, EDWIN L. LLOYD, of Philadelphia, Pennsylvania, have invented a new and useful Improvement in Adjustable Window-Screens, of which the following is a specification:

My invention relates to an improvement in that class of window-screens in which a fixed screen-frame is combined with an adjustable strip or strips, by means of which it is adapted to windows of different sizes, the object of my improvement being to so construct a screen of this class that the frame will be light and neat in appearance and the sliding portions of the frame retained in any position to which they are adjusted. This object I attain in the manner which I will now proceed to describe, reference being had to the accompanying drawing, in which—

Figure 1 is a front view of my improved adjustable window-screen; Fig. 2, a sectional plan on the line 1 2; Fig. 3, a sectional plan on the line 3 4, and Fig. 4 a vertical section on the line 5 6.

A is the screen, carried by a frame consisting of top and bottom bars $a$, which do not extend entirely across the screen, a portion of each end of the latter being unconfined.

B B are the sliding frames, each of which has horizontal portions $b\ b$ and a vertical post, $d$. The horizontal portions $b$ of the frames B are grooved to receive the bars $a$ of the screen-frame, and can slide freely on said bars $a$; and in the vertical post $d$ of each frame is an angular slot, $e$, adapted for the reception of the unconfined end of the screen A, so that, as the frames B B are moved in or out, the ends of the screen slide freely in the slotted posts $d$, suitable pins $i$ on the bars $b$ and bent plates $m$ on the bars $a$ serving as stops to prevent undue outward movement of the frames B.

To the top bar $b$ of one frame B is hung a bar, $n$, having on the lower edge teeth adapted to a lug, $t$, on the top bar of the other frame B. By this means I prevent accidental inward movement of either of the frames after they have been adjusted to their proper positions. As each of the frames B is arranged to embrace the screen on three sides, said frames are rigid throughout, so that a single retaining-bar, $n$, on the upper bar $b$ is sufficient to maintain the frames in their proper positions, whereas a strip adapted to the end only of the screen would require a retainer both at top and bottom.

The bar $n$ may be simply notched instead of toothed on the under side; but the latter plan is preferred.

I prefer to provide the frames B with sheet-metal casings F, as shown at the right-hand side of Figs. 2 and 3, the interior of each casing coinciding with the slot $e$ in the post $d$, to which it is secured, and serving to receive the free end of the screen as the frame B is moved inward. The end of the screen may, however, be allowed to project from the slot without being covered, as shown at the left-hand side of Figs. 2 and 3. By this means I am enabled to make the posts $d$ comparatively narrow, and yet permit an extended movement of the frames B. One adjustable frame only might in some cases be used; but the use of two adjustable frames is preferable.

My improved screen is light and attractive in appearance, the screen proper being unobstructed from end to end, and all unsightly cross-bars in the center of the screen being dispensed with.

I claim as my invention—

1. The combination of the screen A, having top and bottom bars $a$, which do not extend to the ends of the screen, with the adjustable frames B, having curved or angular slots $e$, which receive and guide those portions of the screen A projecting beyond the ends of the bars $a$, all substantially as described.

2. The combination of the screen A, unconfined at the end, with an adjustable frame B, having a slotted post, $d$, and casing F, as specified.

3. The combination of the adjustable portions B of the frame, arranged to embrace three sides of the screen, with the notched or toothed bar $n$ and lug $t$, as set forth.

In testimony whereof I have signed my name to this specification in the presence of two subscribing witnesses.

EDWIN L. LLOYD.

Witnesses:
HARRY A. CRAWFORD,
HARRY SMITH.